United States Patent [19]

Luckan

[11] 4,056,007
[45] Nov. 1, 1977

[54] ARRANGEMENT FOR TREATING WORKPIECES BY CORONA DISCHARGE WITH SHORT-CIRCUIT PREVENTION FEATURE

[75] Inventor: Johannes Luckan, Cologne, Germany

[73] Assignee: Ionit Anstalt Bernhard Berghaus, Vaduz, Liechtenstein

[21] Appl. No.: 768,354

[22] Filed: Feb. 14, 1977

[30] Foreign Application Priority Data

Feb. 18, 1976 Germany .............................. 2606454

[51] Int. Cl.$^2$ .......................... G01K 1/08; B01K 1/00
[52] U.S. Cl. .............................. 73/343 R; 73/359 R; 204/164; 204/177; 250/531
[58] Field of Search ............. 73/343 R, 359; 148/166; 204/164, 177; 250/531

[56] References Cited

U.S. PATENT DOCUMENTS

| 3,308,049 | 3/1967 | Jones et al. | 250/531 |
| 3,536,602 | 10/1970 | Jones et al. | 204/164 |
| 3,863,074 | 1/1975 | O'Hanlon et al. | 204/164 |

*Primary Examiner*—Herbert Goldstein
*Attorney, Agent, or Firm*—Michael J. Striker

[57] ABSTRACT

Short-circuit prevention is provided in an arrangement for measuring temperatures of workpieces to be nitrided. An electrical potential gradient is established between a workpiece and a container in which the workpiece is accommodated so as to heat the workpiece and concomitantly produce in the circumambient region of the workpiece a corona discharge field of ionized particles. In order to measure the temperature of the workpiece, a heat sensor is mounted in the workpiece and extends along a path from the workpiece through the field of particles in the circumambient region and thereupon to the exterior of the container. Due to the presence of the heat sensor in the field, metal particles spattered from the workpiece tend to deposit themselves along the heat sensor. In time, a continuous electrically-conductive path would form intermediate the container and the workpiece which would result in short-circuiting between the former and the latter and thus would lead to the discontinuance of the electrical potential gradient. The invention provides a short-circuit prevention system which prevents desposition of the particles at selected portions of the path so as to avoid any possibility of discontinuance of the electrical potential gradient.

9 Claims, 1 Drawing Figure

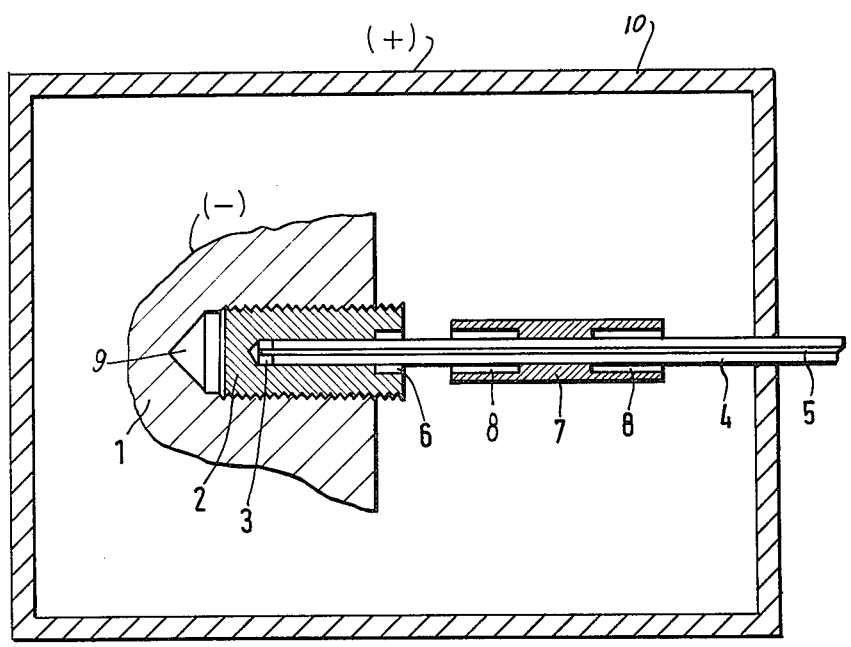

ARRANGEMENT FOR TREATING WORKPIECES BY CORONA DISCHARGE WITH SHORT-CIRCUIT PREVENTION FEATURE

BACKGROUND OF THE INVENTION

The invention generally relates to an arrangement for measuring temperatures of workpieces to be treated in a corona or glow discharge field.

More particularly, the invention relates to an arrangement for measuring temperatures of workpieces to be case-hardened in the presence of a hardening agent, to be carburized, decarburized, metalized or the like.

Still more particularly, the invention relates to an arrangement for measuring temperatures of workpieces to be nitrided in the presence of a nitrogeneous atmosphere, commonly ammonia gas.

Even more particularly, the invention relates to an arrangement for preventing short-circuiting between a workpiece to be nitrided and a container in which the workpiece is accommodated.

The nitrogen case-hardening process which is termed "nitriding" consists in subjecting machined and preferably heat-treated parts to the action of a nitrogeneous medium, commonly partially dissociated ammonia gas, under certain conditions whereby surface hardness is imparted to the material without necessitating any further treatment. The nitriding process imparts to the metal to be case-hardened vastly improved properties such as increased wear resistance, retention of hardness at elevated temperatures, and increased resistance to certain types of corrosion.

It has been proposed to nitride a workpiece by electrically connecting a container in which a workpiece is accommodated to a positive terminal of an electrical current source, and by electrically connecting the workpiece itself to a negative terminal of the electrical current source. The source is of sufficient strength to establish an electrical potential or voltage gradient between the container and the workpiece so as to heat the workpiece and concomitantly produce about the exterior surface of the workpiece, i.e. in the circumambient region of the workpiece, a corona or glow discharge field of ionized particles including nitrogen ions which interact with the surface of the workpiece to thereby penetrate into and harden the exterior surface area of the latter. A corona or glow discharge is a discharge brought about as a result of ionization of a gas medium surrounding a conductor and occurs when the potential gradient exceeds a certain value.

It has further been proposed to measure the temperature to which the workpiece is heated by inserting a thermal sensor element, such as a thermocouple, in a bore either already available or deliberately machined in the workpiece. The thermocouple wires conduct an electrical signal generated from the temperature detected at the heated workpiece in direction along a path from the workpiece to the exterior of the container and thereupon to an indicating and/or measuring instrument.

However, such wires, even though surrounded by a protective tubular member, must pass through the corona discharge field. This results in the decided disadvantage that metal particles spattered from the workpiece because of the bombardement of the ionized particles tend to deposit themselves along the path defined by the wire and the tubular member. In time, a continuous electrically conductive path comprised of such deposited particles-would form intermediate the container and the workpiece. This results in a short-circuit being formed between the container and the workpiece. It will be appreciated that the formation of such a continuous electrically-conductive path also results in the discontinuance of the electrical potential gradient between the container and the workpiece, thus terminating the case-hardening or nitriding operation.

SUMMARY OF THE INVENTION

Accordingly, it is the general object of the present invention to overcome the disadvantages of the prior art.

Another object of the present invention is to prevent short-circuiting between a workpiece to be treated and a container in which the workpiece is accommodated.

Still another object of the present invention is to prevent discontinuance of the electrical potential gradient established between a workpiece and a container in which the workpiece is accommodated.

Yet another object of the present invention is to provide an arrangement for measuring temperatures of workpieces to be heat-treated in a corona or glow discharge field which is reliable and efficient in operation.

In keeping with these objects and others which will become apparent hereinafter, one feature of the invention resides in an arrangement for measuring temperatures of workpieces to be treated in a corona discharge field, particularly of workpieces to be nitrided in the presence of a nitrogeneous medium, which comprises, in combination, a container for receiving a workpiece to be treated, and means for establishing an electrical potential gradient between said container and the workpiece to thereby produce between the container and the workpiece a corona discharge field of ionized particles and concomitantly heat the workpiece. In order to measure the temperature of the workpiece, heat sensing means is mounted in the workpiece and extends along a path from the workpiece through the field of particles in the circumambient region and thereupon to the exterior of the container. In order to avoid formation of a continuous electrically-conductive path comprised of deposited metal particles, the present invention provides means for preventing deposition of such particles at selected portions of the path.

In accordance with the invention, short-circuiting between the container and the workpiece is reliably prevented because of the absence of particles at selected portions of the path. The electrical potential gradient established between the container and the workpiece will therefore not be discontinued as a result of such short-circuiting.

This feature is realized by surrounding portions of the heat sensing means with protective elements which define gaps or spaces with the exterior surface of the heat sensing means. Deposition of metal particles do not occur in such gaps or spaces.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE illustrates a method and an arrangement for measuring temperatures of workpieces to be heat-treated in a corona discharge field with a short-circuiting prevention feature in accordance with the present invention.

DESCRIPTION OF THE PREFERRED EMBODIMENTS:

The single FIGURE diagrammatically shows a metallic container 10 in which at least one metallic workpiece 1 — shown in broken-away vertical section — and preferably a plurality of such metallic workpieces constituting a charge, is accommodated. The container 10 is electrically connected to a positive (+) terminal of a direct current electrical source; and the workpiece 1 is electrically connected to a negative (−) terminal of the electrical current source. The current source may also be an alternating current electrical source.

The current source is operative for establishing an electrical potential or voltage gradient between the container 10 and the workpiece 1 so as to produce in the circumambient region of the workpiece 1 about the exterior surface of the workpiece 1 a cathodic surface glow of a corona discharge field comprised of ionized particles and concomitantly to heat the workpiece 1. The electrical energy supplied is great enough to exceed a certain value required to ionize the gaseous medium surrounding the workpiece 1 and to thereby heat the workpiece 1 to a temperature in the region of 500° C or more. Preferably, the gaseous medium surrounding the workpiece 1 in the container 10 is a nitrogeneous medium, commonly partially dissociated ammonia gas, and such hardening agents are accelerated within the corona discharge field in accordance with the method and arrangement of the invention for nitriding or case-hardening the exterior surface area of the workpiece 1. Of course, other hardening agents such as carbon or boron may also be used.

In order to determine how the nitriding process is progressing, it is desirable to measure the temperature of at least one of the workpieces 1. Hence, heat sensing means, preferably a thermocouple 5, is mounted within a workpiece 1 in heat-conducting relationship therewith so as to generate an electrical signal in dependence upon the temperature detected and, thereupon, to conduct the signal by means of electrically-conductive thermocouple wires from the workpiece 1 towards the exterior of the container 10 to a non-illustrated measuring and indicating instrument.

An electrically-insulating, heat-resistant, tubular, ceramic member 4 is mounted about the heat sensing means so as to electrically insulate the latter from the workpiece 1. The hollow ceramic member 4 also has good heat-conducting properties so that the heat sensing means will remain operative for sensing the temperature at the exterior surface of the workpiece 1 when a sensor portion of the thermocouple is inserted into the interior of the ceramic member 4 and into physical heat-conducting contact therewith.

The ceramic member 4 thus electrically isolates the high voltage existing in the workpiece 1 from the grounded measuring instrument. Since instruments are generally maintained at ground potential and therefore must be protected or electrically isolated from this rather high voltage. Hence, no costly electrical isolation circuitry is any longer required for the measuring instrument.

The tubular member 4 surrounding the wires 5 of the heat sensing means can be extended from a path from the workpiece 1 through the field of particles in the circumambient region and to the exterior of the container 10. Due to spattering of metal particles from the workpiece 1 a deposition of these particles takes place on the tubular member 4. In using metal containing gases for the treatment also some of the metal ions can be deposited on the tubular member 4. In time, the deposited particles would form a continuous electrically-conductive path between the workpiece 1 and the container 10. Such a conductive path would result in short-circuit current passing directly from the workpiece 1 to the container 10. In order to avoid this discontinuance of the electrical potential gradient between the container and the workpiece, the present invention provides for means for preventing deposition of the particles at selected portions of this path.

The preventing means comprises an elongated protective element 7 mounted on the tubular member 4 at a location in the path intermediate the workpiece and the container. The protective element 7 has an interior passage comprised of a main section which fittingly surrounds the tubular member 4, and a pair of end sections 8 at opposite ends of the element 7. Each end section 8 constitutes a blind bore and surrounds the tubular member 4 with clearance so as to bound therewith a space across which deposition of the metal particles cannot occur. As shown in the single FIGURE, the main section of the interior passage has a predetermined cross-sectional dimension, and each end section 8 has a cross-sectional dimension greater than this predetermined dimension of the main section. In other words, the overall cross-sectional configuration of the protective element 7 resembles the letter H.

In order to facilitate the mounting of the heat sensing means in the workpiece 1, a threaded insert 2 is provided with a bore 3 for receiving the tubular member 4. A tapped bore 9 is formed in the workpiece 1 for threadedly receiving the threaded insert 2.

In addition the preventing means also comprises another blind bore 6 formed at an end of bore 3. The bore 6 surrounds the tubular member 4 with clearance so as to bound therewith a space across which deposition of any metal particles is prevented.

In accordance with the invention, the protective element 7 is advantageously constituted by heat-resistant material, such as ceramic material, which can resist the elevated temperatures found in the container 10, normally ranging from 400° to about 1000° C and above.

The spaces and/or gaps formed along the path between the workpiece 1 and the container 10 constitute breaks or interruptions in an electrically-conductive film or layer which may be deposited on the exterior surfaces of the tubular member 4 and the protective sleeve 7.

It will be understood that each of the elements described above, or two or more together, may also find a usefull application in other types of constructions differing from the types described above.

While the invention has been illustrated and described as embodied in a method and arrangement for heat treating workpieces with short-circuit prevention feature, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In an arrangement for measuring the temperatures of workpieces to be treated in a corona discharge field, particularly of workpieces to be nitrided in the presence of a nitrogeneous medium, a combination comprising a container for receiving a workpiece to be treated; means for establishing an electrical potential gradient between said container and the workpiece to thereby produce between the container and the workpiece a corona discharge field of ionized particles and concomitantly heat the latter; means for measuring the temperature of the workpiece, including heat sensing means mounted in the workpiece and extending along a path from the workpiece through said field of particles in said circumambient region and thereupon to the exterior of said container, said heat sensing means tending to be covered by metal particles along said path; and means for preventing deposition of said particles at selected portions of said path so that formation of a continuous electrically-conductive path comprised of particles deposited on said heat sensing means is avoided, whereby discontinuance of the electrical potential gradient due to short-circuiting between said container and the workpiece is prevented.

2. A combination as defined in claim 1, wherein said heat sensing means comprises a thermal sensor mounted in heat-conducting relationship with the workpiece and operative for sensing the temperature to which the workpiece is heated and for generating a signal in dependence upon the temperature detected, and means for conducting said detected signal from the workpiece to the exterior of said container.

3. A combination as defined in claim 2, wherein said heat sensing means further comprises an electrically-insulating, heat-resistance, tubular member surrounding said thermal sensor so as to electrically insulate the latter from the workpiece.

4. A combination as defined in claim 3, wherein said tubular member is mounted in heat-conducting relationship with the workpiece, and wherein said thermal sensor is mounted in heat-conducting relationship with said tubular member.

5. A combination as defined in claim 3, wherein said tubular member is constituted by ceramic material.

6. A combination as defined in claim 3; and further comprising a threaded insert having a bore in which said tubular member is mounted, and a tapped bore in the workpiece for threadedly receiving said threaded insert.

7. A combination as defined in claim 6, wherein said bore of said threaded insert has a main portion for fittingly receiving said tubular member, and wherein said preventing means comprises an end portion on said bore adjacent to said main portion and surrounding said tubular member with clearance so as to bound therewith a space across which deposition of said particles is prevented.

8. A combination as defined in claim 1, wherein said preventing means comprises an elongated protective element mounted on said heat sensing means at a location in said path intermediate the workpiece and said container, said protective element having an interior passage comprised of a main section fittingly surrounding said heat sensing means, and a pair of end sections at opposite ends of said element, each end section surrounding said heat sensing means with clearance so as to bound therewith a space across which deposition of said particles is prevented.

9. A combination as defined in claim 8, wherein said main section has a predetermined cross-sectional dimension, and wherein each end section is a blind bore having a cross-sectional dimension greater than said predetermined dimension of said main section so that said protective element has an overall cross-sectional configuration fashioned after the letter H.

* * * * *